(12) United States Patent
Morris et al.

(10) Patent No.: US 11,752,830 B1
(45) Date of Patent: Sep. 12, 2023

(54) AERODYNAMIC HEAT EXCHANGER FOR A VEHICLE

(71) Applicant: APTERA MOTORS CORP., San Diego, CA (US)

(72) Inventors: Daniel Morris, San Marcos, CA (US); Steve Fambro, San Diego, CA (US); Eric Byers, Oceanside, CA (US); Chris Anthony, San Diego, CA (US); Jason Hill, Costa Mesa, CA (US); John Klopp, III, Encinitas, CA (US)

(73) Assignee: APTERA MOTORS CORP., San Diego, CA (US)

( * ) Notice: Subject to any disclaimer, the term of this patent is extended or adjusted under 35 U.S.C. 154(b) by 0 days.

(21) Appl. No.: 17/930,473

(22) Filed: Sep. 8, 2022

(51) Int. Cl.
*B60H 1/00* (2006.01)
*B62D 35/02* (2006.01)

(52) U.S. Cl.
CPC ..... *B60H 1/00335* (2013.01); *B60H 1/00278* (2013.01); *B62D 35/02* (2013.01)

(58) Field of Classification Search
CPC .......... B62D 35/02; B62D 35/00; B60H 1/02; B60H 1/00; B60H 1/00321; B60H 1/00335; B60H 1/00278; B60H 1/00392; B60H 1/00271; B60H 1/00385; B60H 1/143
See application file for complete search history.

(56) References Cited

U.S. PATENT DOCUMENTS

| | | | | |
|---|---|---|---|---|
| 4,966,408 A | * | 10/1990 | Yura | B60K 11/08 180/89.2 |
| 5,490,572 A | * | 2/1996 | Tajiri | B60L 1/02 180/68.5 |
| 5,513,893 A | * | 5/1996 | Nakata | B62D 35/02 296/180.1 |
| 6,435,298 B1 | * | 8/2002 | Mizuno | B62D 35/02 296/180.1 |
| 7,270,206 B2 | * | 9/2007 | Guertler | B60K 11/06 180/69.1 |
| 9,926,022 B1 | * | 3/2018 | Golembeski | B60K 11/08 |
| 9,950,611 B2 | * | 4/2018 | Pfeiffer | B62D 35/02 |
| 10,377,228 B2 | * | 8/2019 | Kondo | B60K 11/06 |
| 10,476,051 B2 | | 11/2019 | Mardall et al. | |
| 11,070,084 B2 | * | 7/2021 | Yuasa | B60L 53/12 |
| 11,430,044 B1 | * | 8/2022 | Maron | H04W 4/33 |

(Continued)

FOREIGN PATENT DOCUMENTS

| CN | 111452673 A | 7/2020 |
|---|---|---|
| DE | 102021112928 A1 | 12/2021 |
| WO | 2019026908 A1 | 2/2019 |

*Primary Examiner* — James M Dolak
(74) *Attorney, Agent, or Firm* — Nicholas Blanton; Damian Wasserbauer

(57) ABSTRACT

An aerodynamic vehicle includes an aerodynamic heat exchanger formed as one or more body panels disposed along an outer surface of the vehicle having one or more fluidic chambers or micro-channels. The aerodynamic heat exchanger is adapted to provide effective and highly efficient heat transfer, and also to provide substantially reduced or negligible contribution to the aerodynamic drag. The aerodynamic heat exchanger may provide adequate heat rejection capacity throughout vehicle operating conditions that advantageously results in increased fuel economy and overall vehicle performance.

5 Claims, 16 Drawing Sheets

(56) References Cited

U.S. PATENT DOCUMENTS

| | | | |
|---|---|---|---|
| 11,639,097 B2* | 5/2023 | Favela Tentori | B60K 11/04 |
| | | | 123/41.09 |
| 11,642,933 B2* | 5/2023 | Moradnia | B60H 1/00328 |
| | | | 165/202 |
| 2009/0139786 A1* | 6/2009 | Lee | B60K 11/08 |
| | | | 180/68.1 |
| 2020/0168965 A1 | 5/2020 | Tanaka et al. | |
| 2021/0402843 A1 | 12/2021 | Moradnia et al. | |
| 2021/0402869 A1 | 12/2021 | Favela Tentori et al. | |
| 2021/0402870 A1 | 12/2021 | Moradnia et al. | |
| 2022/0097475 A1 | 3/2022 | Huang et al. | |

* cited by examiner

AERODYNAMIC HEAT EXCHANGER FOR A VEHICLE

TECHNICAL FIELD

The present disclosure relates generally to a heat exchanger, and in particular to an electric or solar-electric vehicle having an aerodynamic heat rejection apparatus, system, and method using vehicle panels and other structures.

BACKGROUND

Heat exchangers are in widespread use in consumer, commercial, and other devices and are useful in numerous industrial applications having enclosed spaces such as buildings, space and vehicles. Designs of a conventional heat exchanger has expanded to included considerations of energy conservation, conversion, recovery, and successful adaptation to new energy sources. The importance of energy usage of heat exchangers has also increased from new environmental guidelines on the effects of a warming planet such as thermal, air, and water pollution. A conventional heat exchanger fundamentally operates by the thermodynamic principle that heat moves from a hotter to a colder object, whereby the heat exchanger device incorporates structures forming separate hot and cold regions designed to spontaneously move heat, or thermal energy, from the hotter region to the colder region with no external heat or work interactions, which implies that the transfer of heat occurs passively, or automatically.

One application of heat exchangers relates to vehicles. In order to cool various systems of a vehicle, such as providing ventilation and/or air conditioning to the passengers in the cabin, keeping the motor from overheating, and/or removal of excess heat from devices transferred to another object such as the surrounding air. Conventional heat exchanger designs provide an adequately sized unit to meet the demands of the vehicle's systems by cooling a desired amount when operating the vehicle in the intended manner and/or environment.

One conventional design employs a front-end radiator, located behind a decorative grille as used by vehicles with internal combustion engines. Another conventional design, in the case of electric vehicles, employs a base plate heat exchanger underneath the vehicle, between the wheels and adjacent the battery pack. A base plate heat exchanger of this sort may include a flat base plate or a base plate with openings that scoop air into internal confined passages. While these designs may be adequately sized, in that they provide enough heat rejection capacity to meet the cooling demands of the vehicles systems, they remain aerodynamically inefficient and contribute to the amount of energy or fuel required to propel the vehicle because vehicle body openings, scoops, edges, protuberances, body protrusions, and other vehicle structures contribute significantly to the vehicle's overall aerodynamic drag.

Aerodynamic drag, or air resistance, is a force that the oncoming air applies to the vehicle when it is moving. Aerodynamic drag negatively affects the vehicle's speed, fuel economy, and overall performance. While a variety of different techniques and system configurations have been used for vehicle heat exchanger designs, they suffer from aerodynamic inefficiencies in the form of significant contribution to aerodynamic drag, which in turn affects fuel economy and overall vehicle performance. Accordingly, what is needed is an HVAC system having a heat exchanger that achieves effective heat transfer without contributing to the vehicle's aerodynamic drag. The present invention provides such an HVAC system and heat exchanger.

SUMMARY

The present invention provides a functionally, economically, and aesthetically advantageous vehicular HVAC system that employs an aerodynamic, lightweight heat exchanger including efficient and effective heat transfer.

A further object of the present invention is to provide an aerodynamic heat exchanger that provides at least as much heat rejection capacity as demanded by the vehicle system, throughout most operating conditions while exhibiting a negligible, near-zero contribution to the vehicle's drag.

A further object of the present invention is to provide an aerodynamic heat exchanger that relies on a variety of modes of heat transfer, including free convection, radiation, and/or forced convection.

A further object of the present invention is to provide an aerodynamic heat exchanger that eliminates, or substantially eliminates, flow separation occurring over the heat exchanger, thereby decreasing drag of the heat exchanger when drag factors are considered in isolation or regarding the overall vehicle turbulence and laminar flow. It is a further object of the present invention to reduce flow separation and drag, whereby vehicle performance may be increased.

A further object of the present invention is to provide an aerodynamic heat exchanger that eliminates, or substantially eliminates, the heat exchanger's contribution to the pressure drag and/or friction drag of the vehicle, whether considered in isolation or in structures of the overall vehicle.

A further object of the present invention is to provide a leading edge of a vehicle that includes a curved nose and wide body to induce the formation of uniform streamlines throughout the length of the vehicle, including airflow over the heat exchanger.

A further object of the present invention is to reduce or eliminate perturbances that 'trip' or otherwise induce turbulence of the airflow over the vehicle, including airflow over the heat exchanger.

A further object of the present invention is to provide front suspension struts shaped like airfoils to reduce induced turbulence between the body-perturbance interface, thereby reducing friction drag and providing a mechanism for flow reattachment downstream of the strut.

A further object of the present invention is to provide an aerodynamic heat exchanger formed integrally with a body panel, thereby reducing weight and increasing vehicle performance.

A further object of the present invention is to provide an aerodynamic heat exchanger that is easily serviceable in that the heat exchanger may include a plurality of fluidly-separate chambers, configured in a series or parallel flow path. The plurality of chambers provides for more readily removing and/or replacing an area of the heat exchanger that experienced localized damaged, thereby leaving the other unaffected chambers in place. It is a further object of the present invention that such chambers may form individual body panels of the vehicle.

A further object of the present invention is to provide an aerodynamic heat exchanger that uses a water-glycol mixture, thereby reducing the amount of pressurized refrigerant circulating throughout the vehicle by utilizing one or more fluid circuits in lieu of extensive refrigerant circuits, to reduce the likelihood of pressure loss and/or other damage of the refrigerant loop.

A further object of the present invention is to provide an vehicle heat-exchanger that may be mass-produced at low cost, for example, by providing a plurality of chambers corresponding to body panels that may fit within available commercial machinery, e.g. commonly-sized machinery.

Other desirable features and characteristics will become apparent from the subsequent detailed description, the drawings, the abstract, and the claims, when considered in view of this summary.

DESCRIPTION OF THE DRAWINGS

Non-limiting and non-exhaustive embodiments of the present disclosure are described with reference to the following drawings. In the drawings, like numerals describe like components throughout the several views.

For a better understanding of the present disclosure, reference will be made to the following Detailed Description, which is to be read in association with the accompanying drawings, which are incorporated in and constitute a part of this specification, show certain aspects of the subject matter disclosed herein and, together with the description, help explain some of the principles associated with the disclosed implementations, wherein:

FIG. 14 is a schematic view illustrating the flow field formed around a vehicle characterized by numerous flow separations, wherein:

DETAILED DESCRIPTION

Figure 1:
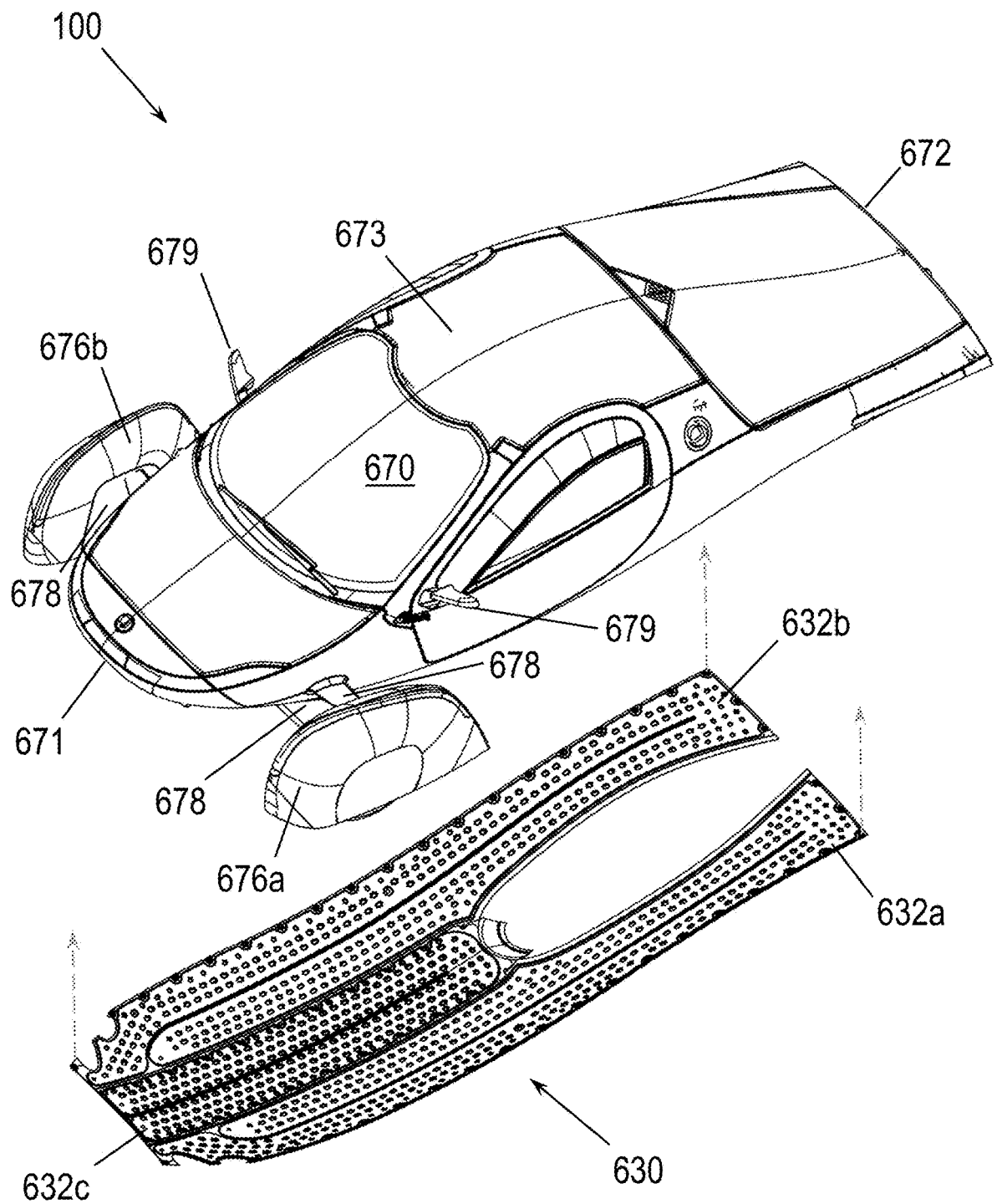
FIG. 1 illustrates a front, top, right-side, exploded, perspective view of an aerodynamic vehicle including an aerodynamic heat exchanger, according to an embodiment of the present invention.
Figure 2:
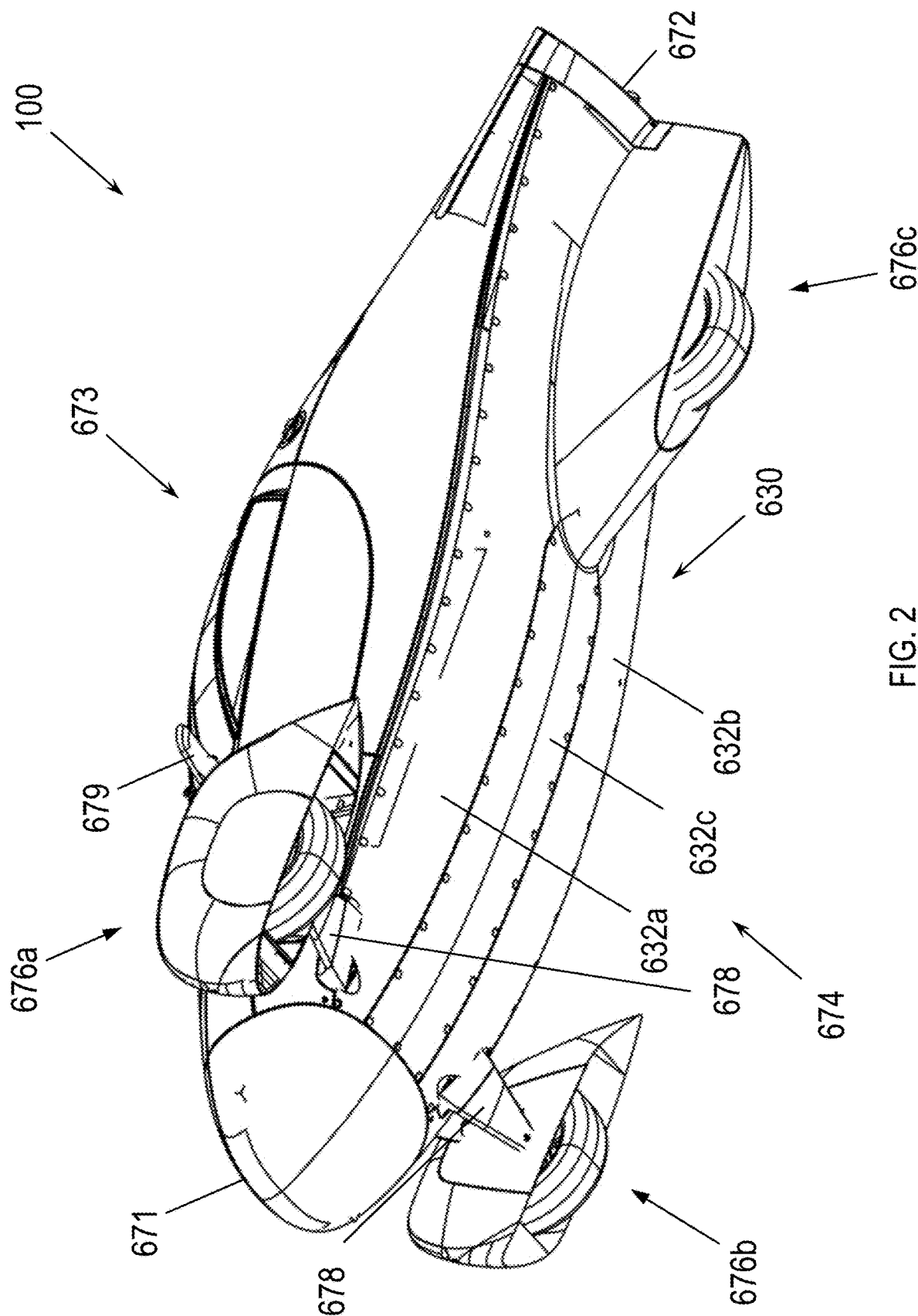
FIG. 2 illustrates a front, bottom, right-side, perspective view of an aerodynamic vehicle including an aerodynamic heat exchanger, according to an embodiment of the present invention.
Figure 3:
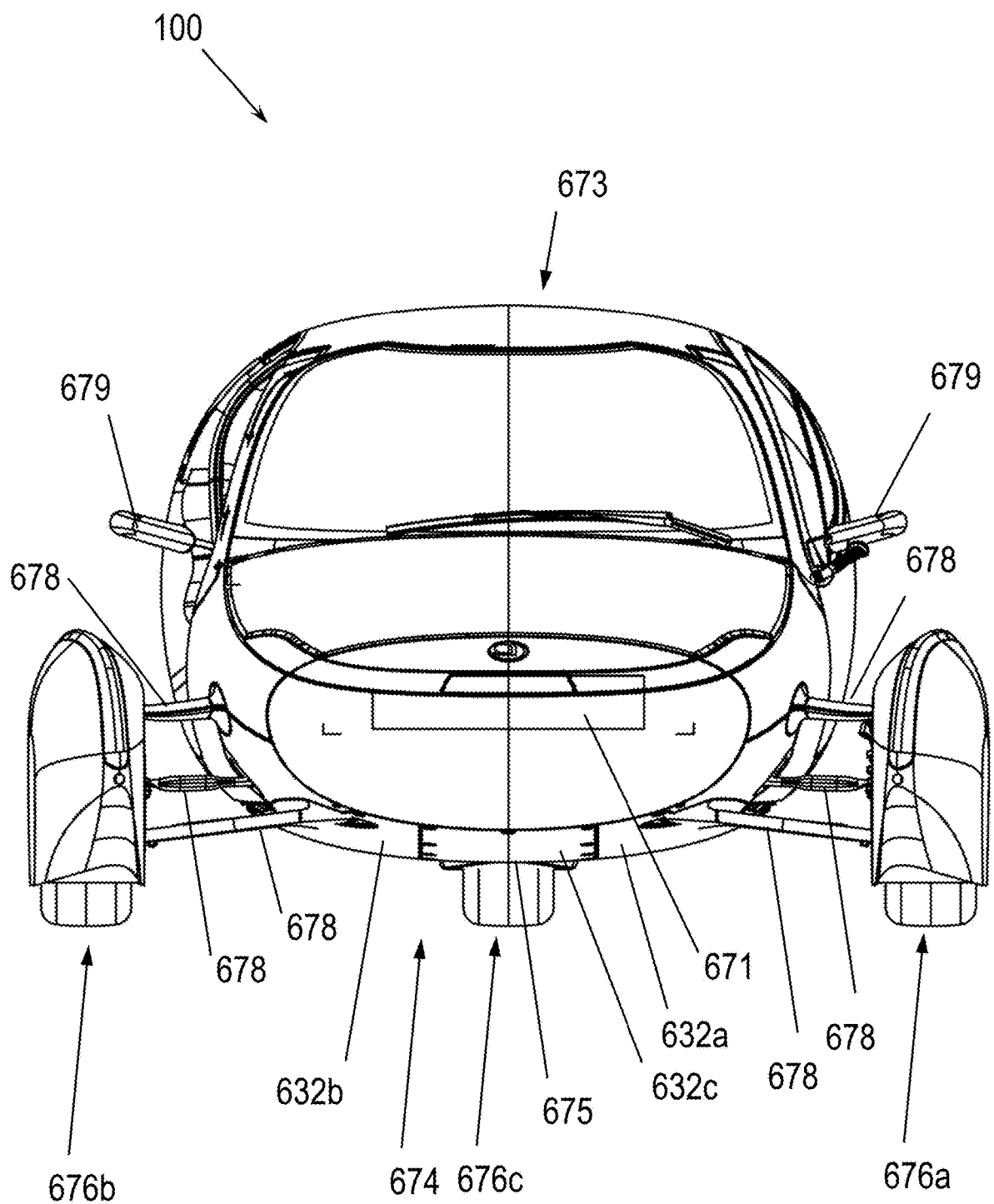
FIG. 3 illustrates a front view of an aerodynamic vehicle including an aerodynamic heat exchanger, according to an embodiment of the present invention.
Figure 4:
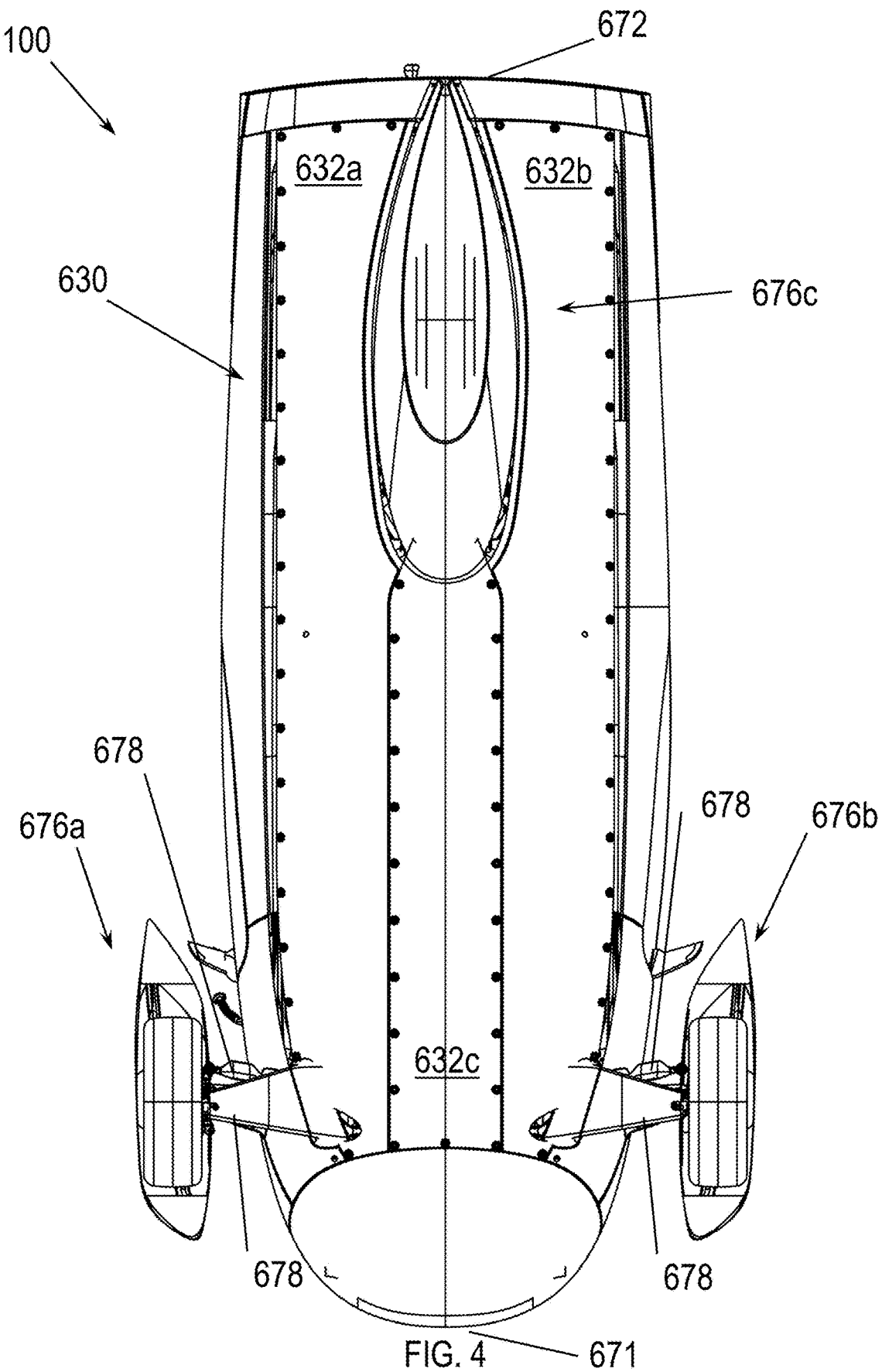
FIG. 4 illustrates a bottom view of an aerodynamic vehicle including an aerodynamic heat exchanger, according to an embodiment of the present invention.
Figure 5:
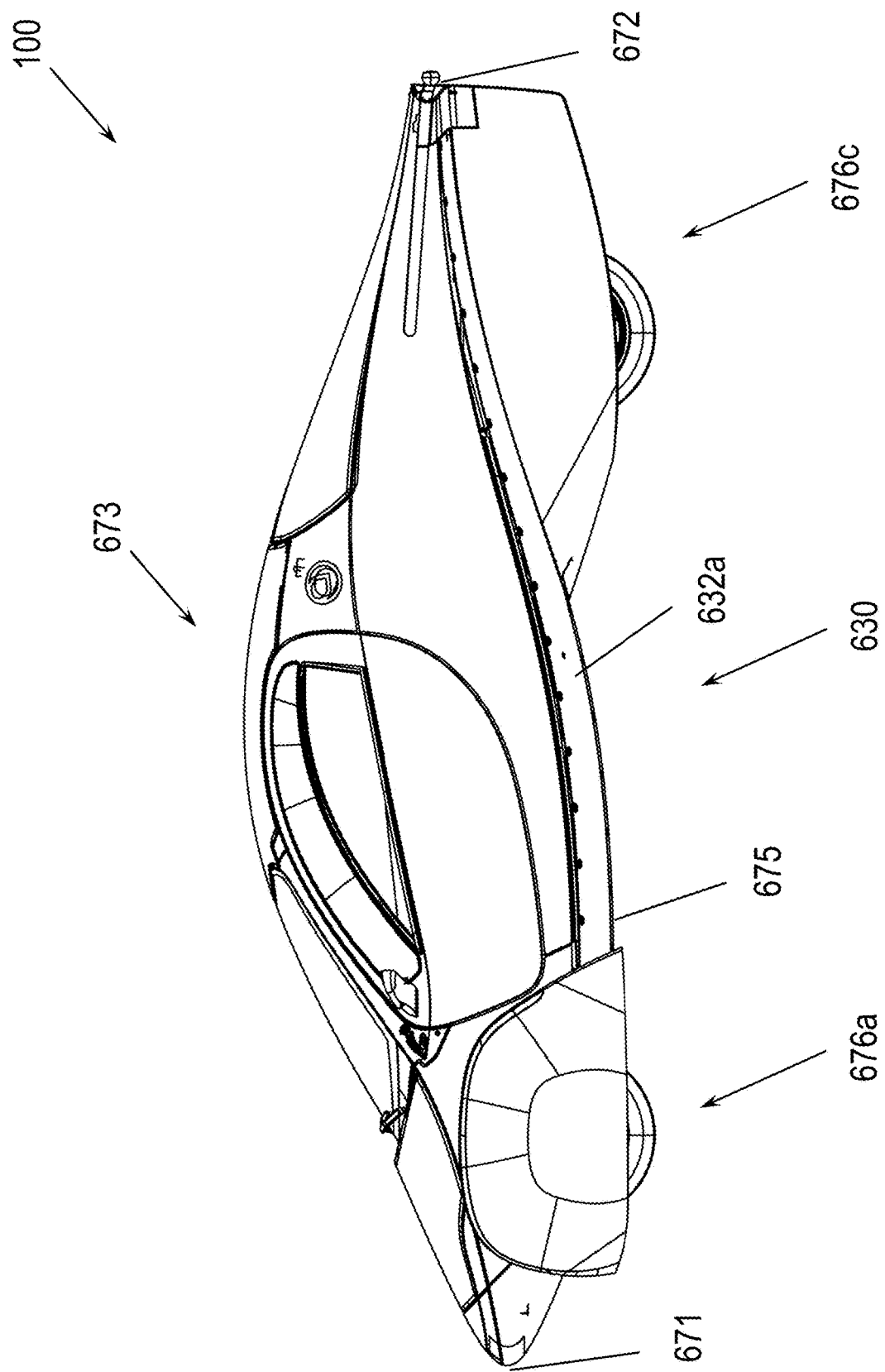
FIG. 5 illustrates a right-side view of an aerodynamic vehicle including an aerodynamic heat exchanger, according to an embodiment of the present invention.

Non-limiting embodiments of the invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention. The drawings featured in the figures are provided for the purposes of illustrating some embodiments of the invention and are not to be considered as limitation thereto.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present disclosure, and are not to be considered as a limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

Referring to FIGS. 1-16C, an HVAC system generally designated as reference element 600 is useful for heating, cooling, and ventilating an aerodynamic vehicle 100. FIGS. 1-13 refer to embodiments of the HVAC system 600 having an aerodynamic heat exchanger 630 according to the present invention, and FIGS. 14 to 16A-16C refer to various aerodynamic features and/or parameters of the embodiments disclosed herein.

The HVAC system 600 comprises a user interface 815, an HVAC control system 805, and a plant system 605, wherein HVAC system 600 may be configured to provide the heating, cooling, and ventilating demands of demand systems 650. In particular, HVAC system 600 of aerodynamic vehicle 100 may employ one or more aerodynamic heat exchangers 630. One or more aerodynamic heat exchangers 630 may be formed as one or more body panels disposed along an outer surface of aerodynamic vehicle 100 to provide heat rejection of demand systems 650 via heat transfer communication with various other subsystems of plant system 605. Aerodynamic heat exchanger 630 provides a functionally, economically, and aesthetically advantageous design adapted for: providing effective heat transfer under all operating conditions of vehicle 100, such as sufficient heat rejection capacity to meet the needs of demand system 650; providing highly-efficient, heat transfer through passive convective and radiative heat transfer to the ambient environment over all, or at least most, of the vehicle's operating conditions; providing substantially reduced or negligible contribution to the aerodynamic drag, i.e., a substantially reduced or negligible external drag 661 contributed by the aerodynamic heat exchanger, either in isolation or in combination with other components of vehicle 100. As should be appreciated, aerodynamic heat exchanger 630 comprises one or more fluidic chambers, e.g., 632a-c as in FIG. 1, which are described in the context of one or more body panels disposed along the underside, or undercarriage, of the vehicle 100, but may alternatively comprise one or more body panels disposed on any surface of the exterior, including hood panel, roof panel, trunk panel, front-side panel, mid-side panel, back-side panel, door panel, front wheel cover, and/or rear-wheel skirt. However, in the preferred embodiment, aerodynamic heat exchanger 630 is disposed along the underside to avoid direct exposure to the sun.

FIGS. 1-13 correspond to a heat exchanger 630 having an aerodynamic shape with specific geometric dimensions and operating parameters according to an embodiment of the present invention. First, design cooling load ranges have been estimated to be from about 1 kW to about 3 kW, e.g., demand systems 650. Cooling capacity is calculated based upon summer high temperature conditions (e.g., 99.5% design condition for hottest operating climate zone) which necessitates, e.g., cabin cooling demand. Second, concerning the capacity of the aerodynamic heat exchanger 630, 20 kW of heat rejection has been estimated, corresponding to a capacity when the aerodynamic vehicle 100 has reached sufficient speed, above about 10 mph to about 15 mph. Therefore, the estimated heat rejection capacity of the aerodynamic heat exchanger 630 exceeds the estimated cooling load by a factor of 10 over the operable range under consideration for this primary mode of heat rejection, i.e., passive convention and/or radiation from the heat exchanger surface to the ambient. The invention provides a solution to the heat rejection problem resulting in improved heat transfer effectiveness, i.e., the ability of the system to keep demand systems operating within design temperature conditions, e.g., passenger sets cabin 800 temperature to 70° F. during a design day in Washington, D.C. of 95° F./78° F., dry bulb temperature/wet bulb temperature. According to another embodiment of the present invention, the heat exchanger 630 may be operably coupled to a supplemental system to provide forced convection, such as a fan, so as to meet cooling demands as desired, for example, when the vehicle 100 is stationary or moving at a sufficiently slow rate with the precise speed varying depending on, for example, ambient conditions and cooling demands.

Over the aforementioned operable range such factors of efficiency of heat transfer has been achieved by the aerodynamic heat exchanger 630 as fans are not needed to push air over the surface of the heat exchanger, as is typical in conventional front-end heat exchangers, or in certain types of base plate heat exchangers common to electric vehicles. Combining the aerodynamic heat exchanger 630 with the structure of the vehicle provides a reduction in energy on account of the substantially reduced or negligible drag. The aerodynamic heat exchanger 630 uses comparatively less energy than would otherwise be required. Therefore, the claimed invention has improved heat transfer design aspects relating to heat transfer effectiveness and efficiency as the aforementioned objects of the present invention.

The aerodynamic heat exchanger 630 is characterized in substantially reducing or having negligible contribution to the aerodynamic drag on the aerodynamic vehicle 100, and vehicle aerodynamics more generally, flow generated by the movement of a road vehicle is extremely complex. The aerodynamic vehicle 100 design optimizes aerodynamic performance by decreasing total air drag 660, thereby increasing fuel economy, vehicle performance, and achieving an aerodynamic vehicle 100 capable of traveling about 1,000 miles on a single charge. To that effect, the body shape of aerodynamic vehicle 100 has a design with significantly improved aerodynamic characteristics over conventional vehicles. For example, aerodynamic vehicle 100 achieves a drag coefficient of $C_d$=0.13, as compared to, e.g., a common four-door sedan, like Opel Vectra (class C), having a reported drag coefficient of $C_d$=0.29, or a Tesla model 3 or model Y, having a reported drag coefficient of $C_d$=0.23. See: https://www.engineeringtoolbox.com/drag-coefficient-d_627.html. Applicants has configured the aerodynamic heat exchanger 630 to provide sufficient performance in isolation for the entire vehicle 100 as well as additional performance from factors due to the cumulative aerodynamic effects of components and features from the entire vehicle 100 and/or its operation.

Referring to FIG. 1-5, an aerodynamic vehicle 100 comprises a body 630 including a leading edge 671, a trailing edge 672, an upper body portion 673, a lower body portion 674, the lower body portion having a maximum thickness 675, and first, second, and third wheel assemblies, 676a, 676b, 676c, respectively. Wheel assemblies may couple to body 630 via one or more aerodynamic struts 678. The body 670 may include a plurality of body panels including a hood panel, roof panel, trunk panel, front-side panel, mid-side panel, back-side panel, door panel, front wheel cover, and/or rear-wheel skirt. The body 670 may further comprise an aerodynamic heat exchanger 630, which may include first, second, and third chambers 632a, 632b, 632c, respectively. Aerodynamic heat exchanger 630 may form a body panel, such as along the underside 674 shown in FIG. 2. The arrangement shown therein provides a heat rejection surface area of about 3 $m^2$, which conforms to the aerodynamic body 670 shape of the vehicle 100.

In alternative embodiments, aerodynamic heat exchanger 630 may be formed on any exterior portion of body 630, such as one or more of the body panels mentioned. In this context, a body panel refers to an exteriorly-exposed object, i.e., an object exposed to ambient airflow that couples to the structure of the vehicle. Such a body panel may itself form at least part of the structure thereof, or it may couple to a structural frame within body 630.

Although embodiments shown in FIGS. 1-12 include first, second, and third chambers 632a, 632b, 632c, respectively, any number of chambers may be used, and the number, specific sizing, and thermal and/or mechanical coupling of said chambers are non-limiting and considered as being within the scope of this disclosure. For example, two or more discrete chambers may be arrayed in the longitudinal direction, i.e., extending from front end 671 to trailing end 672. Such an arrangement advantageously facilitates manufacturability, serviceability, repair, replacement, and the like of such body panels. As another example, any arrangement of common chambers may be coupled to plant 605 in any known method of one skilled in the art, such as reverse return connections which facilitates uniform return fluid temperature. Furthermore, any fluid may be disposed therein aerodynamic heat exchanger 630, such as, for example, refrigerant, a glycol/water mixture, or water. Aerodynamic heat exchanger 630 may comprise an inner chamber portion 634 coupled to an outer chamber portion 633, which may be fixedly coupled to one another via gasket(s) and one or more fastener assemblies 640, or by any known method. Furthermore, aerodynamic heat exchanger 630 may comprise any material or any combination of materials, for example, aluminum may be used.

Figure 6:
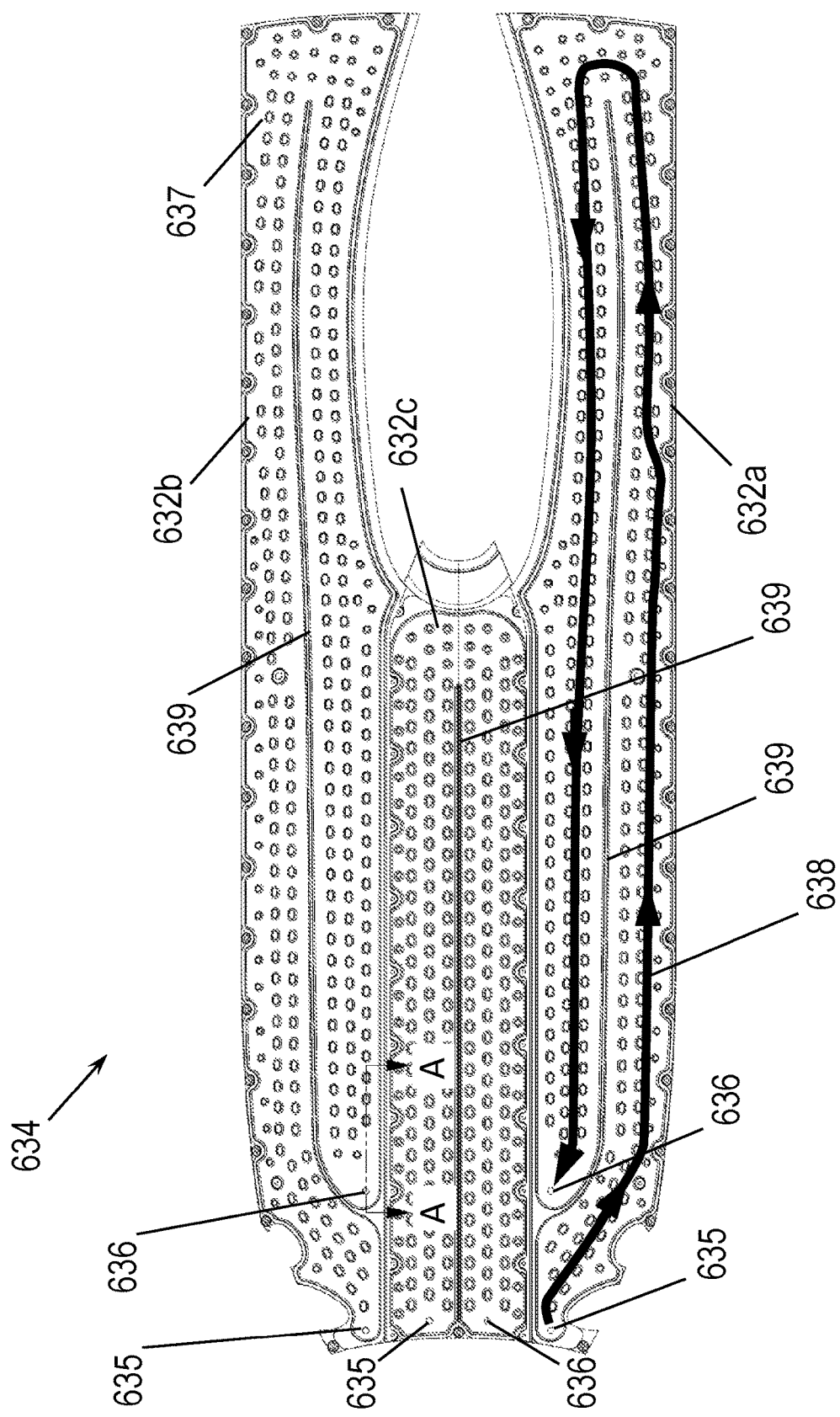
FIG. 6 illustrates a bottom, interior view of an inner chamber portion of an aerodynamic heat exchanger, according to an embodiment of the present invention.

FIG. 6 shows the interior side of an inner chamber portion 634 of aerodynamic heat exchanger 630. Inner chamber portion 634 may be manufactured in discrete portions corresponding to first, second, and third chambers 632a, 632b, 632c, respectively, or may be manufactured as a single element. Each chamber 632a-c may comprise an inlet opening 635, an outlet opening 636, indentations 637, which may be stamped features 637, a fluid channel 638, and a channel divider 639. Fluid channel 638 may comprise and be composed of an entirety of the wetted surfaces formed by portions of inner chamber portion 634 coupled and outer chamber portion 633. Alternatively, fluid channel 638 may comprise a streamline path of a plurality of flow paths, such as that shown in first chamber 632a of FIG. 6, extending between inlet opening 635 and outlet opening 636. The flow direction in any chamber, such as chambers 632a, 632b, 632c is exemplary, and the opposite flow direction may be used.

Figure 7:
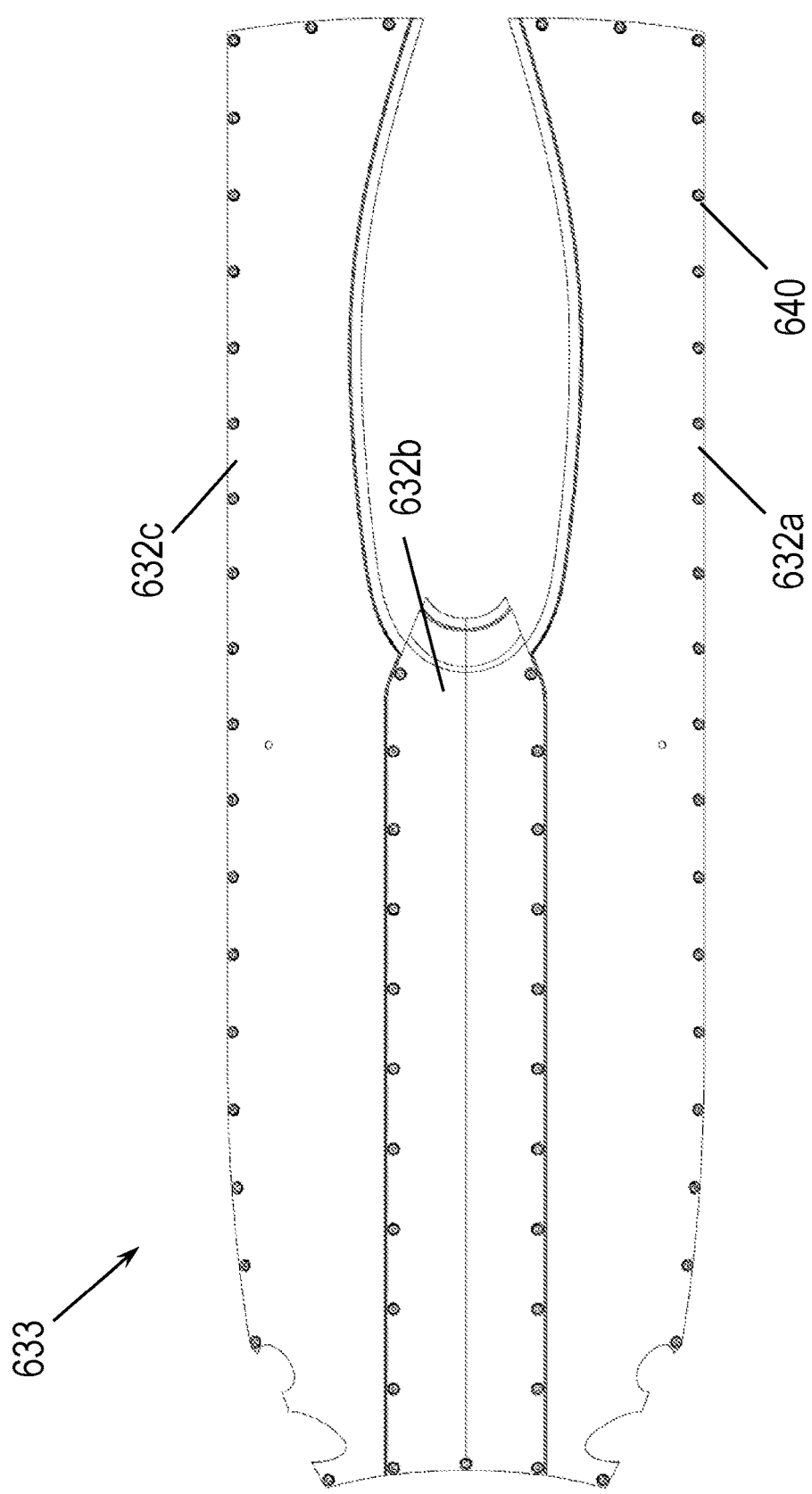
FIG. 7 illustrates a bottom view of an outer chamber portion of an aerodynamic heat exchanger, which may be a body panel of the aerodynamic vehicle, according to an embodiment of the present invention.
Figure 9:
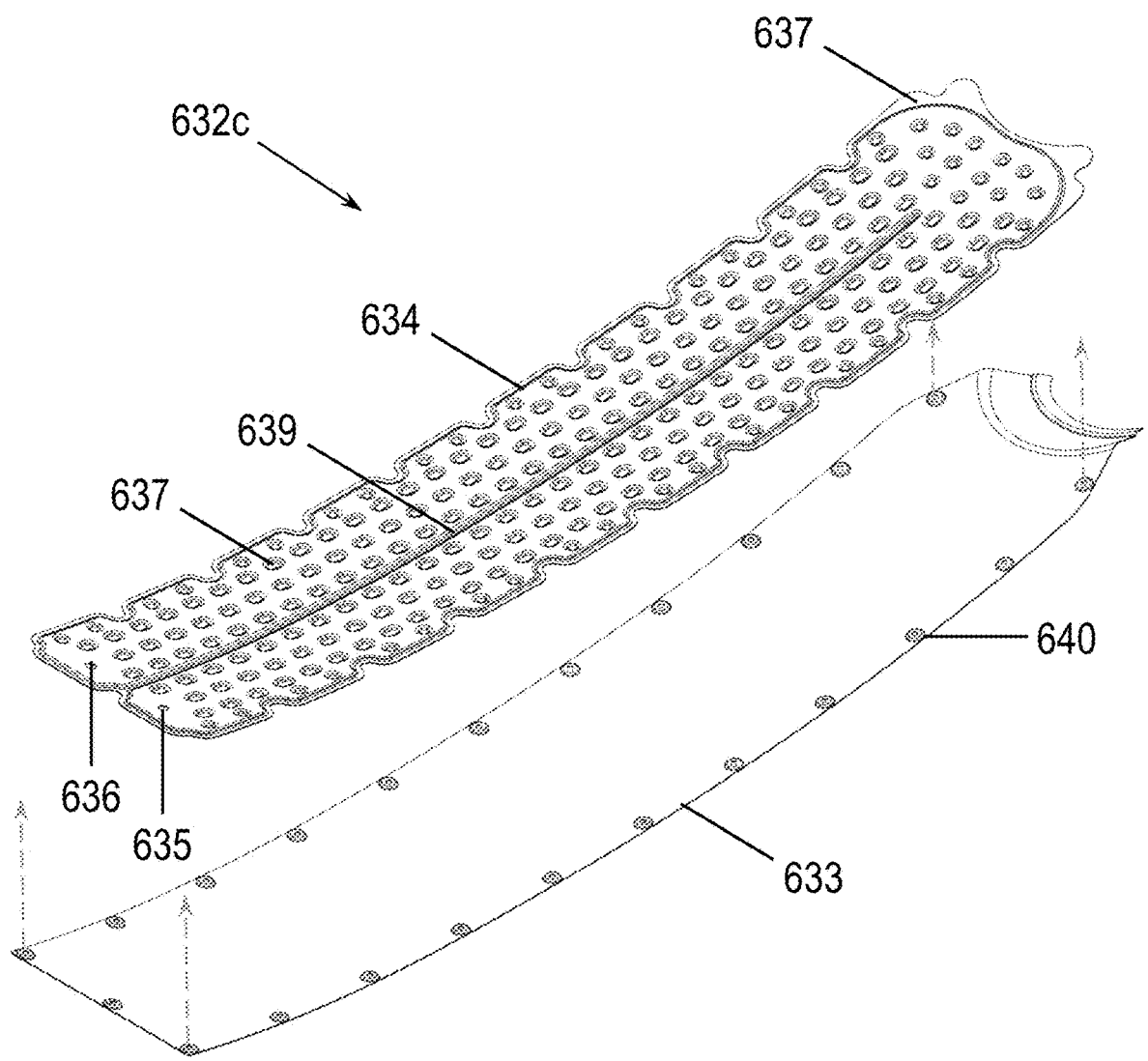
FIG. 9 illustrates a front, top, right-side, exploded, perspective view of a portion of a third chamber of an aerodynamic heat exchanger, according to an embodiment of the present invention.

FIG. 7 shows an outer chamber portion 633, which similarly may be manufactured as a single element and/or in discrete portions corresponding to first, second, and third chambers 632a, 632b, 632c, respectively. The outer chamber portion 633 may be formed to provide the desired aerodynamic characteristics including fastener assemblies 640 being formed substantially flush with the outer surface of outer chamber portion 633 such that the flow is not perturbed, remains laminar and/or is otherwise conducive to low drag. Such fastener assemblies 640 may be disposed along the entirety of the perimeter of each chamber 632a-c, or may be formed along a portion thereof. Other locations may couple to further components of aerodynamic vehicle 100 using suitable fasteners, adhesives and/or other coupling methods. FIG. 9 shows an exploded view of third chamber 632c comprising inner chamber portion 634 and how it may be coupled, or otherwise arranged to outer chamber portion 633.

Figure 8:
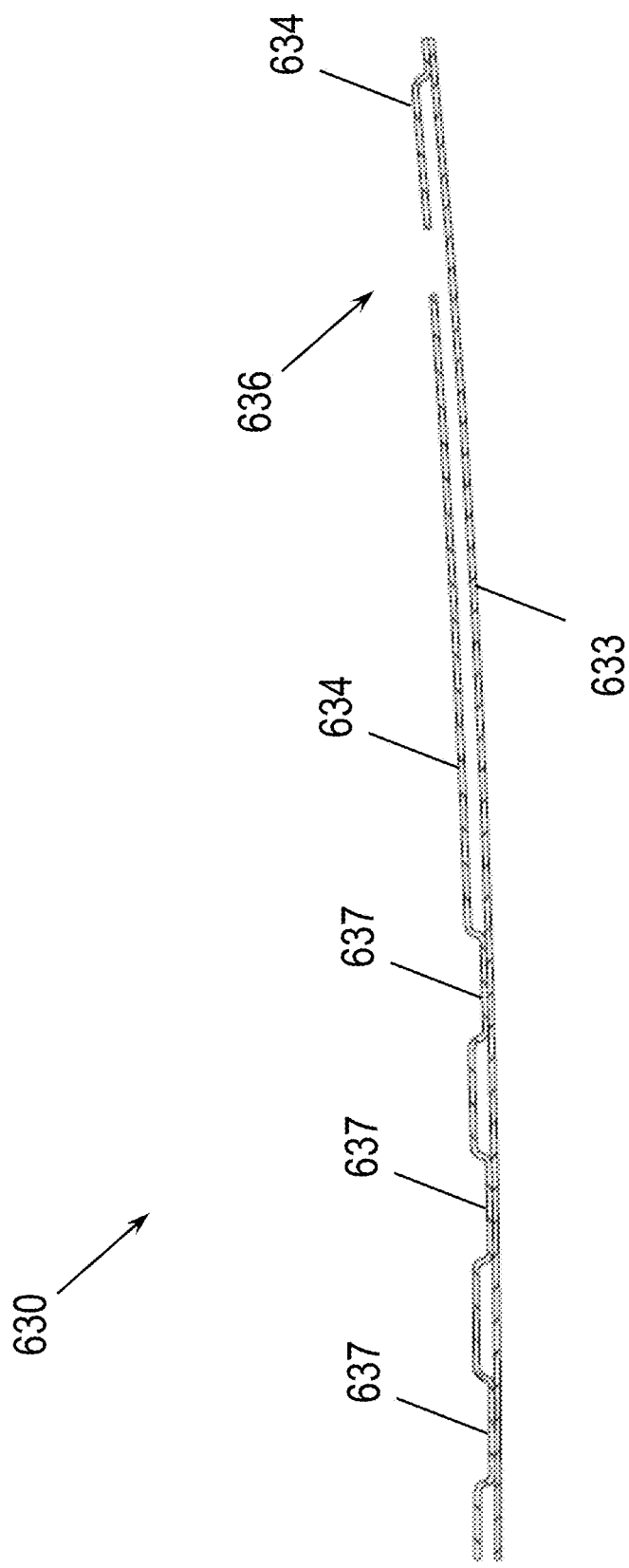
FIG. 8 illustrates a cross-sectional view taken along the line A-A in FIG. 8, which shows aspects of a second chamber of an aerodynamic heat exchanger, according to an embodiment of the present invention.

As shown in FIG. 8, a cross-sectional view of inner chamber portion 634 and outer chamber portion 633 of second chamber portion 632b along line A-A, illustrates the indentations 637 that provide mating surfaces for the outer chamber 633 and inner chamber portion 634. Indentations 637 may be formed by stamping and other manufacturing technologies, and joined by braising, welding, fastening or bonding with thermally conductive adhesive. The indentations 637 may comprise portions of inner and outer chamber portions 634, 633 that form flow barriers along a portion of indentation 637 where flow is to be prohibited, to promote a serpentine path, and to provide desirable mixing effects. Alternatively, the indentations 637 may comprise only inner chamber portion 634 in a space or void that exists between each indentation 637 and outer chamber portion 633. One or more channel dividers 639 may be used to form an extended fluid separation along a length of each chamber 632a-c. The effect of each channel divider is to promote fluid migration to one or more offset dimensions between a physical distance from the inlet 635 and/or outlet 636, which also promotes more effective heat transfer. In the embodiment shown in FIG. 6, The one or more channel dividers force(s) the flow to travel the length of the section 632b and back, thereby providing maximum contact area between the fluid and the radiator 631. Other macro flow paths 638 are also possible as facilitated by the one or more channel dividers 639 that may result a serpentine path. Within the fluid chamber 638, indentations 637 may be uniform or otherwise discrete and may be arrayed in any suitable manner to cause turbulent flow that further increases the efficiency of heat transfer from the fluid to the aerodynamic heat exchanger 630.

Figure 10:
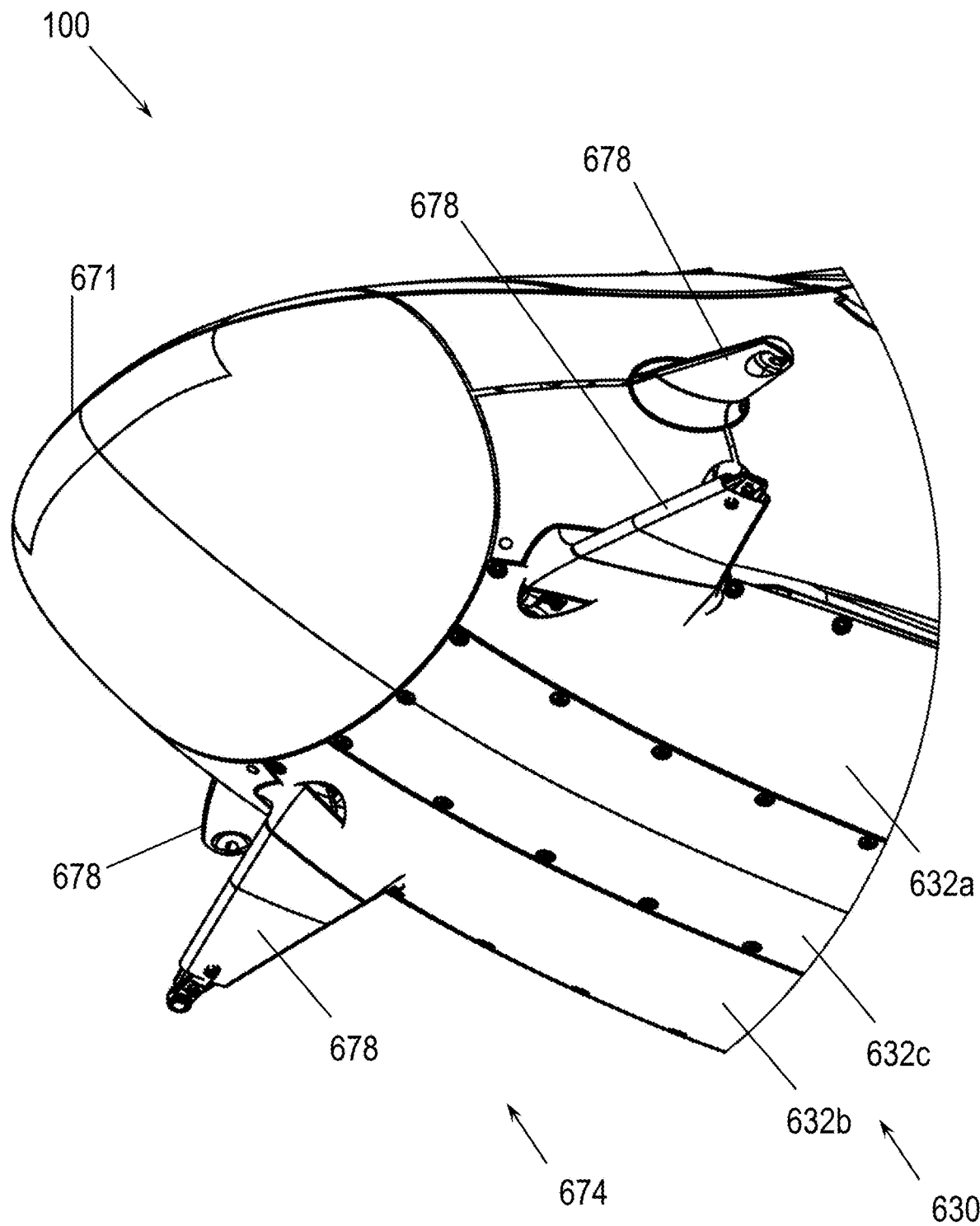
FIG. 10 illustrates a front, bottom, right-side, perspective view of an aerodynamic vehicle with wheel assemblies omitted, according to an embodiment of the present invention.
Figure 11:
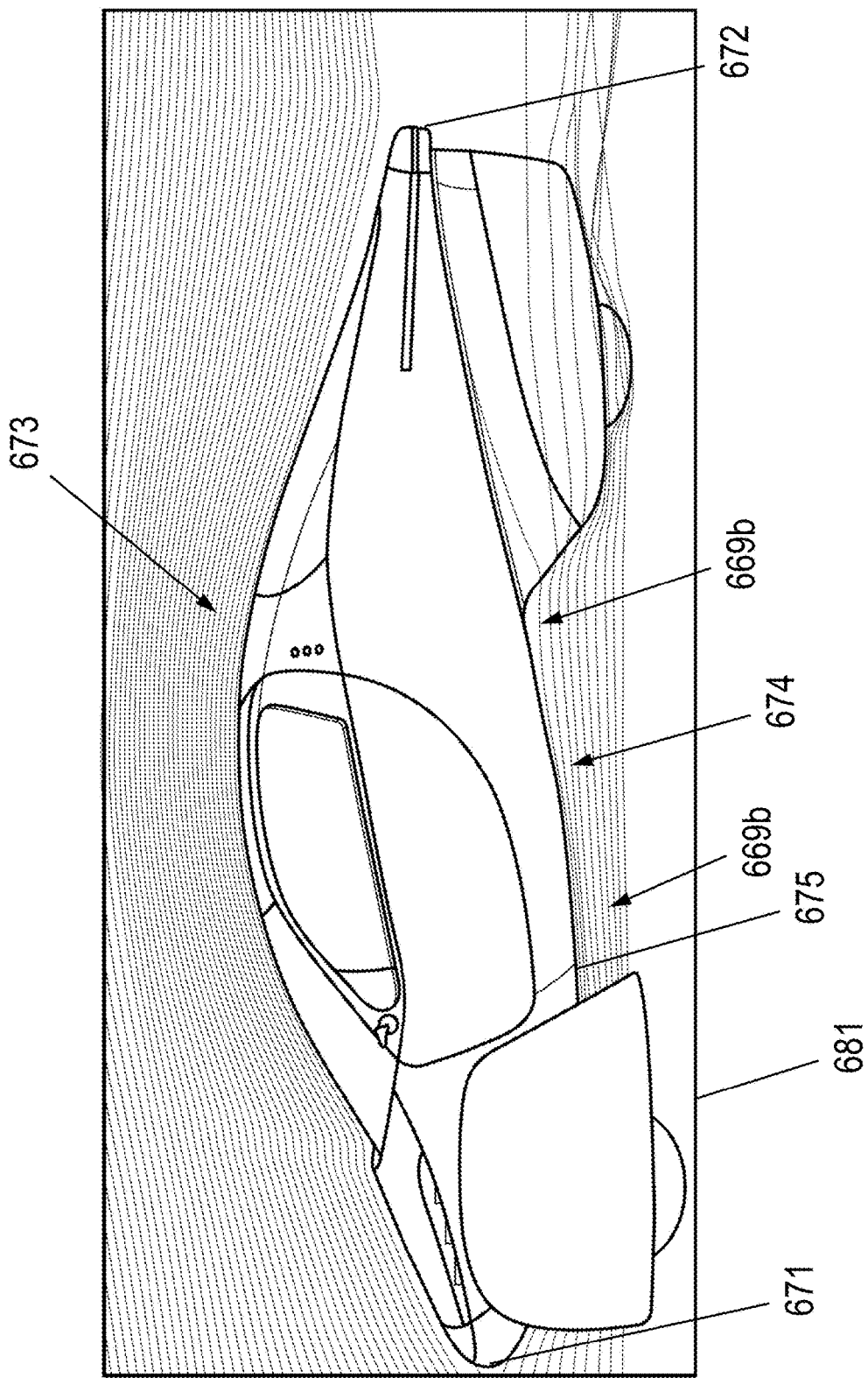
FIG. 11 illustrates a right-side view of an aerodynamic vehicle including an aerodynamic heat exchanger showing streamlines along the center thereof.

FIGS. 1-12 illustrate structures of an embodiment of the aerodynamic vehicle 100 that result in a low total drag coefficient, of about $C_d$=0.13, as can be measured using computational models and tools for fluid dynamics, CFD, and other simulations showing the results in the high aerodynamic performance of the inventive aerodynamic heat exchanger 630 to provide increased fuel economy and/or vehicle driving range—as in the case of an electric battery powered vehicle. CFD simulations and analysis are known tools and although a thorough explanation lies beyond the scope of this disclosure, an elementary explanation may aid in understanding of the underlying theory from which the structure of the present invention relates. CFD applies to a body, such as body 630, or more completely aerodynamic vehicle 100, surrounded by a fluid flow having boundary conditions at some distance away from the body. Boundary conditions 681 along the perimeter as shown in FIG. 11 is one such example, where conditions that accurately define such characteristics as a uniform flow field 669*a* as in FIG. 16A and also rigid bodies such as the road surface. The flow field 669*a* for which a solution is sought then lies within that boundary 681 and around vehicle 100, which requires the solution of three-dimensional Navier Stokes equations. The flow field 669*a* is assumed to be a continuous medium that is discretized into points along the flow field, then data values are determined using tools including a numerical solver and arranging the terms in an appropriate way, such as, for example, in one or more tri-diagonal matrices, characteristics including but not limited to velocity, V, pressure, p, and shear stress τ. Such tools provide data values in an iterative vehicle design, where structural aspects can be varied and aerodynamic flow field effects observed. Other tools include vehicle models and/or prototypes designed for small-scale wind tunnel testing and/or full-scale analysis using sensors, etc., so as to evaluate designs. While other vehicle designers also conduct aerodynamic tests and/or experiments, problems such as positioning a spoiler or other protuberance that is forward of the heat exchanger extending continuously from side-to-side (body width, or width of the heat exchanger) results in poor aerodynamic performance. Again, the present invention solves at least this problem.

Referring to FIG. 10, the positions of aerodynamic struts 678 are shown, having the first, second, and third wheel assemblies, 676*a*, 676*b*, 676*c*, omitted, with respect to body 670 for a clear view of the strut to body positions according to an embodiment of the invention. Aerodynamic struts 678 may be formed as zero-camber, i.e., non-lift inducing, airfoils, which minimize the extent of flow separation caused therealong to keep a laminar boundary layer for as long as possible along the characteristic length of a vehicle because a turbulent boundary layer increases the total drag 660. According to the invention, flow is largely laminar as air flows along body 670 following the flow path from front end 671 and along lower body portion to at least maximum thickness 675.

As shown in FIG. 11 a laminar region 669*b* may be seen along the center-line, or mid-section, of the vehicle. The various flow separations common among conventional vehicle bodies is shown to be avoided, e.g., flow separation region(s) at body 680*a* of FIGS. 15A-15F, as described in detail herein. As a flow field is introduced along the front end 671, the aerodynamic vehicle 100's curved nose and wide body induce the formation of laminar streamlines throughout the length thereof. Then, aerodynamic structure exemplified by body 670 of aerodynamic vehicle 100 ensures that the flow is not substantially "tripped" prior to passing over the aerodynamic heat exchanger 630, which would thereby induce turbulence and an increase in body drag 663. Next, as air passes the lower body portion maximum thickness 675 along lower body portion 674, the flow downstream of this line maintains a laminar boundary layer. This results in the desired effect of inhibiting flow separation and recirculation regions, which would otherwise attribute to an increase in the body drag 663.

Figure 12:
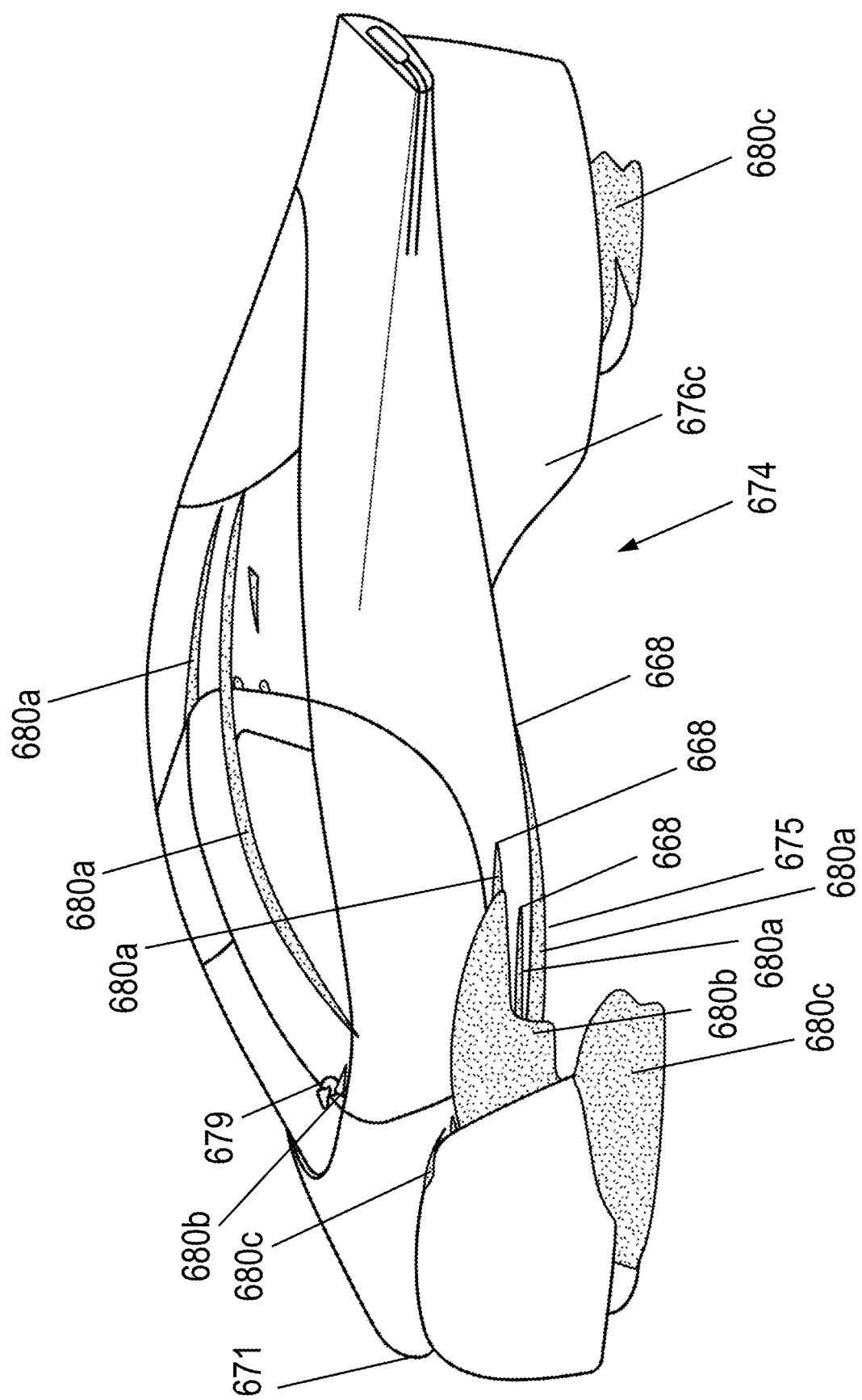
FIG. 12 illustrates a rear, top, right-side perspective view of an aerodynamic vehicle including an aerodynamic heat exchanger showing flow separation regions along the body thereof.

The effects of the aerodynamic struts 678 and aerodynamic interactions thereof with body 670 may be observed in FIG. 12. As uniform flow field 669*a* passes over front end 671, the flow substantially attaches to body 670, however, discrete regions of flow separation may occur, such as, for example, body flow separation 680*a*, protuberance flow separation 680*b*, and wheel assembly flow separation 680*c*. The body flow separation 680*a* illustrates the discrete, localized occurrences where flow separates from body 670 over portion of aerodynamic heat exchanger 630, and/or, the body 630 en totum. Importantly, as may also be observed, flow re-attachment 668 occurs proximate the lower body portion maximum thickness 675, and thereafter, effects from the one or more aerodynamic struts 678 are mitigated.

Figure 13:
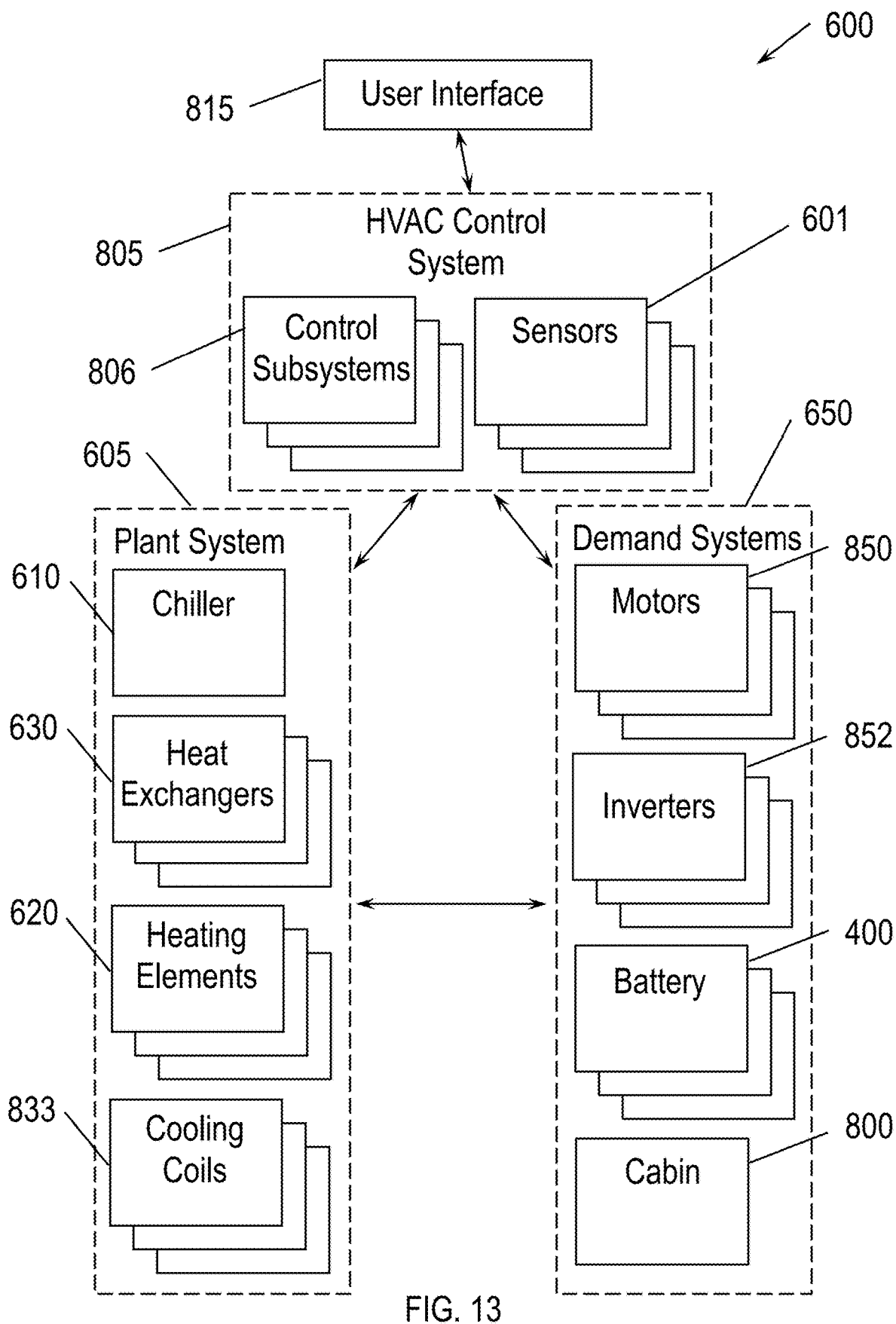
FIG. 13 illustrates a schematic diagram of an exemplary HVAC system layout, according to an embodiment of the present invention.
Figure 14:
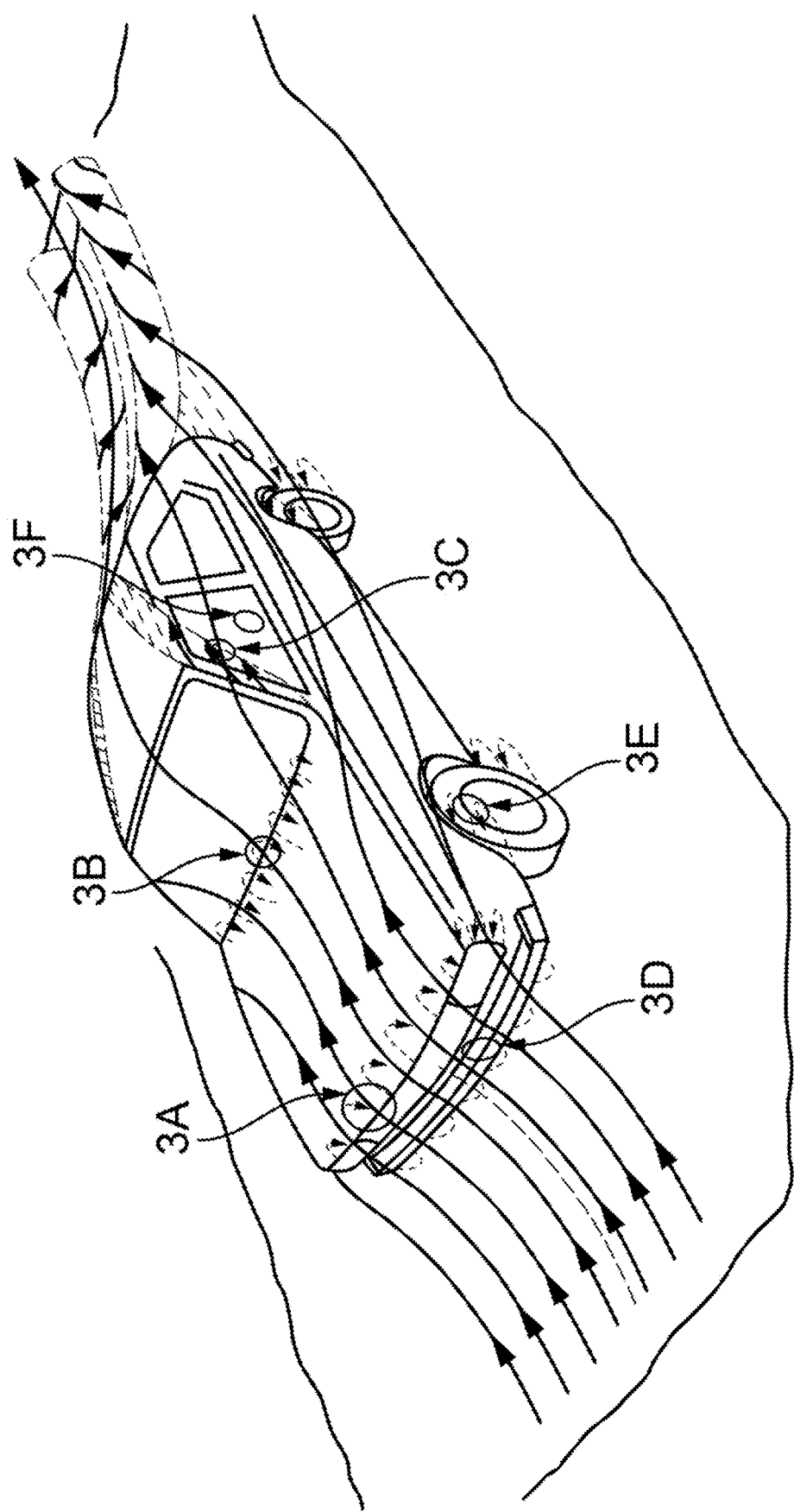

Having described certain structural attributes, aerodynamic heat exchanger 630 is now described in the context of its configurations within HVAC system 600. FIG. 13 is a schematic view illustrating the HVAC system 600 wherein each type of component may contain one or more of the same component, but preferably has the quantity shown, i.e., one or multiple. An HVAC system 600 as represented in FIG. 13 is useful for illustrating the environment in which the present invention pertains and is provided for in the context of its functional components. The HVAC system 600 may comprise plant and demand system 605 and 650, respectively, as well as controls 805 thereof and a user interface 815. The phrase "user interface" in this context may refer to any type of surface capable of receiving a command from a user within a vehicle, including but not limited to a touchscreen, a touchscreen having one or more knobs and/or buttons protruding therefrom, and a digital display with or without control knobs and/or buttons.

A plant 605 typically defines where energy is transferred, or transformed, from one form to another, and it may include a chiller 610 that defines a source of cooling, one or more heating elements 620 which define a source of heating. And then a plant 605 may also include various exchangers, such as a aerodynamic heat exchanger 630 to reject heat to the ambient, but also heat exchangers disposed within the vehicle 100, such as for exchange of heat among dissimilar media, like refrigerant-to-water, refrigerant-to-air etc. Plant 605 may also include cooling coils 833 to condition an airflow conveyed by an airside system (not shown here), such as a fan, and passed through air flow channels and vents to cabin 800. The heating elements in this context may be one or more electric heating coil, but other types of heating elements are considered herein as well.

Demand systems 650 may comprise motors 850, inverters 852, batteries 400, and a cabin 800 and/or other components that require heating, ventilation, and/or air conditioning. Components comprising demand systems 650 may be in any arrangement of thermal communication with said plant system 605 components that is useful to achieve the desired objection. Furthermore, each class or type of subcomponent for which demand systems 650 comprises may be circuited to/from a dedicated chiller 610, a dedicated heat exchanger 630, a dedicated heating element 620, and/or a dedicated cooling coil 833. Cooling energy may originate in the plant 605 within the chiller 610 via a compressor-powered refrigerant loop, or with "free cooling" employed by one or more aerodynamic heat exchangers 630—a heat transfer method that takes advantage of the ambient temperature being colder than the temperature of the demand system 650 component to be cooled. Similarly, heating energy may originate in the plant 605 within a heating element 620, or with "heat pump" activation of the chiller cycle, or with "free heating" employed by one or more aerodynamic heat exchangers 630. In general, separate heat exchangers 630 are characterized as having a dedicated inlet and outlet, but other characterizations fall within the scope of this disclosure as have been described herein. In an example embodiment of potential combinations of plant 605 and demand 650 systems components, vehicle 100 comprises three aerodynamic heat exchangers 630, two heat exchangers mechanically and thermally coupled to the battery 400 and cabin 800, and one aerodynamic heat exchanger 630 mechanically and thermally coupled to the motors 850 and inverters 852.

The user interface 815 can be formed as a display having a touchscreen designed to give the user control over many aspects of the plant and demand systems 605, 650 of the vehicle 100. For example, the user interface 815 can be used to control temperature, humidity, and/or ventilation conditions of the various components defined by demand systems 650. Passenger-input to the user interface 815 may determine whether cabin 800 demands heating, cooling and/or ventilation, whereas computer-controlled commands determine input and output to other demand systems in a passive, i.e., non-passenger-input manner. Furthermore, via the HVAC control system 805, the user interface 815 may provide airflow and temperature control within discrete locations of the cabin 800, such as control to individual passengers or the driver, and also to cabin 800 locations, such as the floor, chest level, head level, ceiling, or windows via selection of appropriate airflow channels and/or directional control of vanes.

HVAC control system 805, and control subsystems 806 thereof, can include controllers, processors, memory, and storage. The HVAC control system 805 can send instructions to the airside and plant systems 605, 820. The HVAC control system 805 can also receive feedback from conditions of the various components of demand systems 650, via various sensors 601, e.g., for temperature, humidity, voltage, amperage, impedance, etc., and/or cameras, to further specify desirable conditions therein and thereof. Furthermore, the HVAC control system 805 can send information to the display of the user interface 815 to display setpoints and the like to be viewed by the user or controlled automatically by the control system 805. Additionally, all manner of sensors may be deployed throughout locations in the system 600, such as thermistors and the like, to form the basis of controlling intelligently the characteristics of the demand systems 650 and/or plant system 605.

FIGS. 14 and 15A-15F illustrate certain aerodynamic aspects and parameters relating the heat exchanger 630 formed with the structures and panels of an aerodynamic vehicle 100. As used herein, many of the drag forces acting on a vehicle and their interrelated design factors are shown the Table 1 below for ease of describing the claimed invention.

TABLE 1

| Total air drag, 660 | | | | |
|---|---|---|---|---|
| External drag, 661 | | Internal drag, 662 | | |
| Body drag, 663 | Protuberance drag, 664 | Engine Cooling drag, 665 | Ventilation drag, 666 | Component cooling drag, 667 |
| Pressure drag, p, 663a | Friction drag, τ, 663b | | | |

According to Table 1, total air drag 660 acting on a vehicle includes external drag 661 and internal drag 662 components. External flows in this context, from which external drag 661 results, refers to unconfined flows occurring over surfaces including, but not limited to, one-sided surfaces, flat plates, circular cylinders, vehicle body panels, and other surfaces. External drag 661 can then include body drag 663 and protuberance drag 664, where the former generally refers to drag from a primary body, and the latter generally refers to drag from an object or component that protrudes outwardly from the surface of the primary body. Protuberance drag 664 may also account for the confluence of airflows, i.e., localized mixing, between the protruding object and the body from which it extends. Body drag 663 can be decomposed into mutually-orthogonal forces, pressure drag 663a, p, which acts normal to the surface of a body, and friction drag 663b, a shear stress, τ, that acts tangential to the surface.

Internal flows in this context, from which internal drag 662 results, refers to flows occurring in confined passages of various regular or irregular, singly or doubly connected, constant or variable cross sections including, but not limited to, circular, rectangular, triangular, annular, and other cross sections. Internal drag 662 can include engine cooling drag 665, ventilation drag 666, and component cooling drag 667.

FIGS. 14 and 15A-15F further illustrate some of the ways in which total air drag 660 traditionally manifests in the form of a flow field around a vehicle. Such a conventional flow field is characterized by numerous flow separations, a concept related to drag that will be further elaborated upon below. The following qualitative explanation regarding FIGS. 15A-15F demonstrates some of the types of drag that typically occur, but additional subcategories of drag may be applicable thereto, and additional formulations as to the decomposition of total air drag 660 may be similarly applied. Therefore, the application of the Table 1 framework to the various figures and/or in the specification shall be construed as non-limiting, and is generally being used to aid in understanding of central concepts pertinent to the present invention.

In contrast to the flows around aeronautical configurations, the road vehicle flow field is characterized by flow separation regions both large and small. These flow separation regions may exhibit quasi-two-dimensional or fully three-dimensional flow fields. In the case of the former, the representative flow fields shown in FIGS. 15A, 15B, and 15D-15F represent quasi-two-dimensional flow fields. In contrast, FIG. 15C as illustrated represents a fully three-dimensional flow field. The smaller regions of local separation occur at body appendages, like protuberances 664, including headlights, mirrors, door handles, windscreen wipers, and other appendages. Large areas of separated flow are present at the trailing perimeter of the vehicle body and on the underside or undercarriage of a conventional vehicle, as in FIG. 15D, where the flow is disturbed by mechanical and structural elements and by the rotating wheels.

Figure 15A:
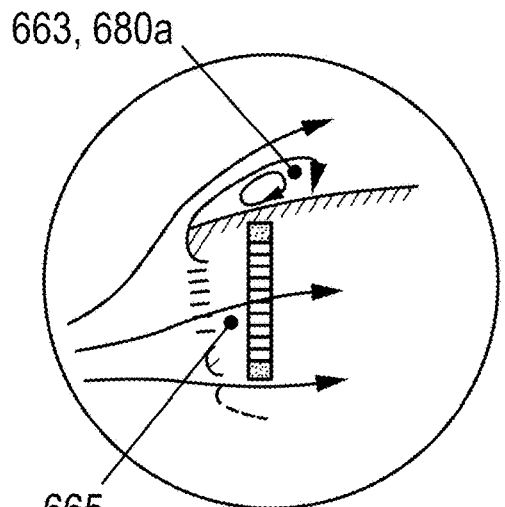
FIG. 15A illustrates an enlarged, cross-sectional, right-side view of flow through the front-end grille and radiator, with flow separation, body drag, and engine cooling drag thereof.
Figure 15B:
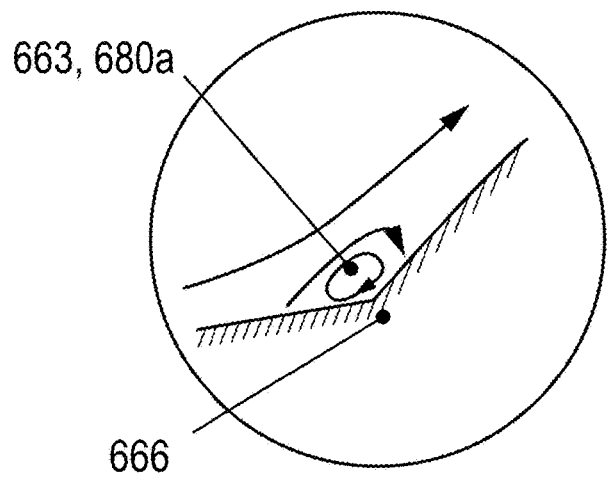
FIG. 15B illustrates an enlarged, cross-sectional, right-side view of flow at the intersection of the hood and the windshield, with flow separation, body drag, and ventilation drag thereof.
Figure 15C:
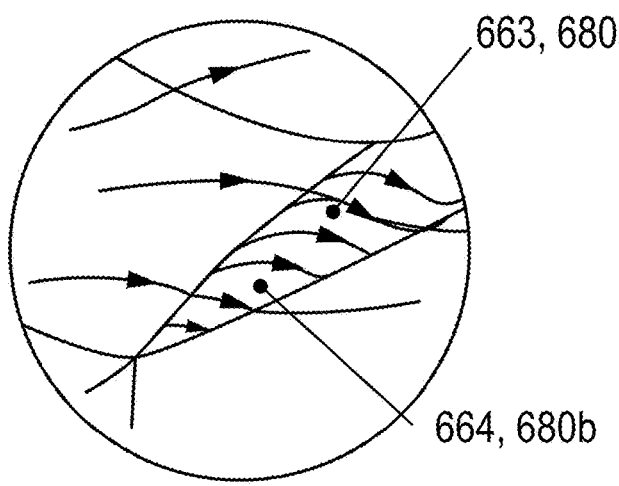
FIG. 15C illustrates an enlarged, perspective view of flow over the side of the windshield along the driver's-side door, with flow separation and body drag thereof.

In the case of the front-end radiator, for example as in FIG. 15A, this form of heat exchanger relies on air being forced in between the array of small fins and tubes—a process that increases drag, and which is classified as engine cooling drag 665. Such front-end conventional designs may also include body drag 663 resulting from a body flow separation region 680a. FIG. 15B illustrates the intersection of the hood and the windshield, with body drag 663 resulting from a body flow separation region 680a, and ventilation drag 666 resulting from a cowl inlet for fresh air to the cabin. Ventilation drag 666 with cowl inlet is representatively shown in FIG. 14. FIG. 15C illustrates how flow over the side of the windshield along the driver's-side door experiences body drag 663 resulting from a body flow separation region 680a and localized protuberance drag 664 and associated protuberance flow separation region 680b resulting from a side-rear view mirror (not shown) that extends outwardly from the body of the vehicle.

Figure 15D:
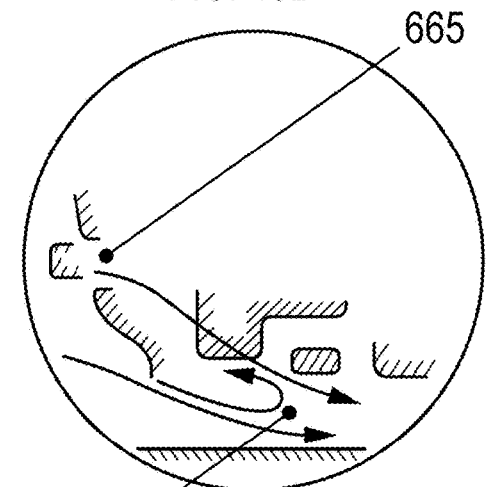
FIG. 15D illustrates an enlarged, cross-sectional, right-side, view of flow though the front-end grille and fender spoiler, with body drag, protuberance drag, and engine cooling drag thereof, and with flow separation occurring underneath the vehicle.

FIG. 15D illustrates, in a centrally-disposed cross-section, flow though the front-end grille resulting in body drag 663, 680a and engine cooling drag 665, and a front fender spoiler, which may be characterized as protuberance drag 664, 680b that extends underneath the vehicle and acts to form a larger effective front-end area, thus also increasing and contributing to body drag 663. In the case of an electric vehicle having an undercarriage base plate, for example, vehicle components forward of the heat exchanger, such as the suspension and openings in the undercarriage, effectively 'trip' the flow, causing the airflow to become turbulent—a design aspect that also increases drag. These designs may employ a spoiler, such as the spoiler as in FIG. 15D located on the front fender, to try to mitigate such drag effects, but the aerodynamic contribution to increased drag still remains. Also, the addition of such components employed to offset aerodynamic contribution add weight to the vehicle, thereby decreasing fuel economy and performance.

Figure 15E:
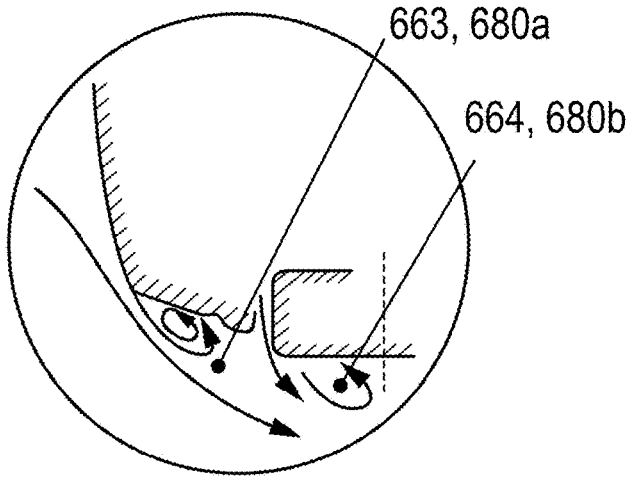
FIG. 15E illustrates an enlarged, cross-sectional, top view of flow around the driver's-side extending over the wheel, with flow separation, body drag, and protuberance drag thereof.
Figure 15F:
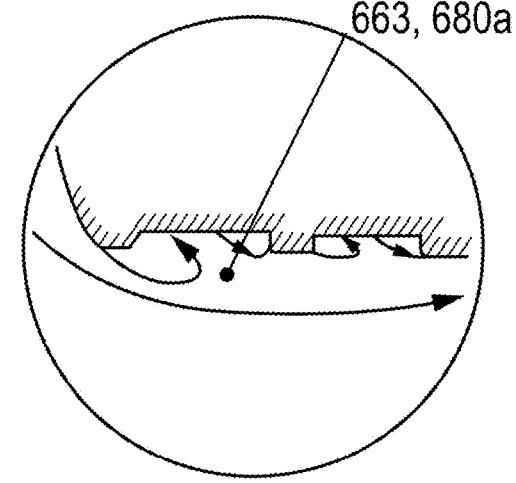
FIG. 15F illustrates an enlarged, cross-sectional, top view of flow around the driver's side extending over the front and rear doors of the vehicle, with flow separation and body drag thereof.

FIG. 15E illustrates, in a cross-sectional view, flow extending around the driver's-side body and wheel, body drag 663, 680a, and extending within the wheel to cool brakes, e.g., disk brakes, drum brakes, brake shoe, resulting in component cooling drag 667. The tire may also be characterized in terms of protuberance drag 664, 680b with flow interactions of the same with the surrounding vehicle body. Lastly, FIG. 15F illustrates a top view of flow around the driver's side extending over the front and rear doors of the vehicle, resulting in body drag 663, 680a. Each of the aforementioned examples include flow separation, which is representative of regions having eddies and/or recirculation regions.

Figure 16A:
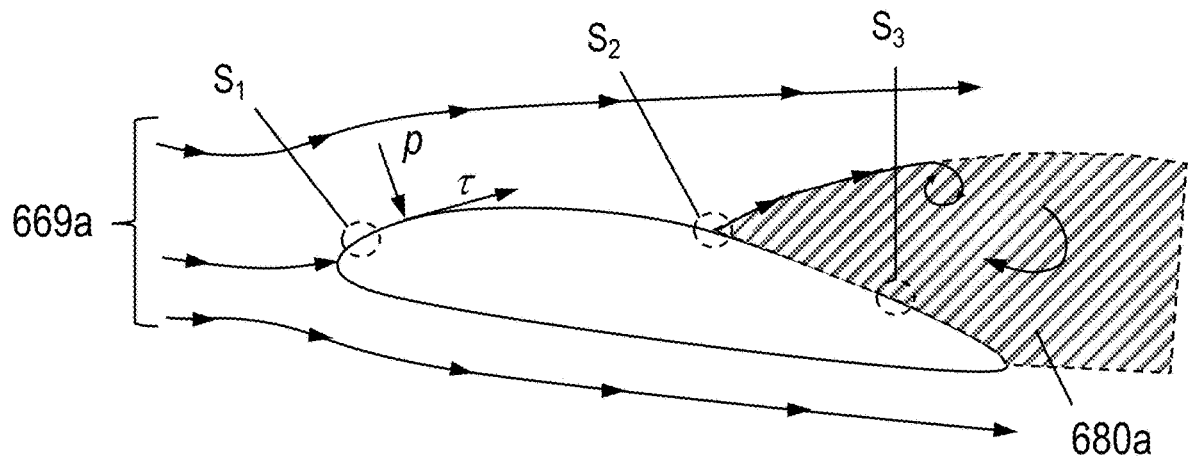
FIG. 16A illustrates a cross-sectional view of the effect of viscosity on an exemplary body in a uniform velocity fluid field, with separated flow resulting from an adverse pressure gradient.
Figure 16B:
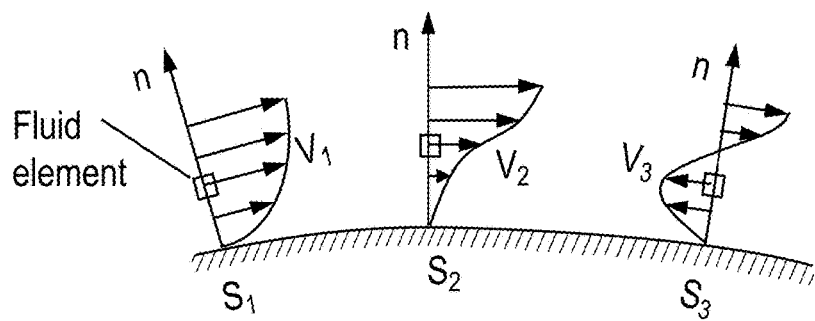
FIG. 16B illustrates flow profiles of positions $S_1$, $S_2$, and $S_3$ taken from FIG. 16A.
Figure 16C:
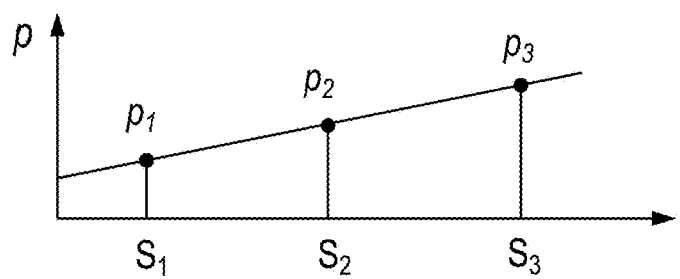
FIG. 16C illustrates an adverse pressure gradient, in accordance with FIGS. 16A and 16B.

FIGS. 16A-16C illustrate the aspects, concepts, and terms used to describe the present invention flow separation as applied to aerodynamic heat exchanger 630 in a viscous flow field. As shown in Table 1, external drag 661 exerted on a body can be defined as the summation, or decomposition, of pressure drag p, 663a and friction drag $\tau$, 663b, where p represents the per unit area force acting normal to the surface of the body, and $\tau$ represents the per unit shear stress acting tangentially to the surface of the body. For a slender body, like aerodynamic vehicle 100, which has an aspect ratio of approximately 1:4, height to length, laminar flow is desirable and moreover, $\tau \gg p$. In contrast, for a blunt body, like a cylinder or sphere having an aspect ratio of 1:1, height to length, turbulent flow is desirable, and moreover, $p \gg \tau$. Laminar flow in this context refers to a flow where the velocities are free of random fluctuations at every point in the flow field, and thus the flow is highly ordered. Turbulent flow in this context refers to a flow where the fluid particles do not travel in a well-ordered manner and, instead, the flow of fluid particles is very irregular and tortuous. As will be described, in the case of the body shown in FIG. 16A—as is the case with aerodynamic vehicle 100—it is desirable to keep the flow from separating to maintain laminar flow, thereby reducing friction drag $\tau$, and pressure drag p.

FIG. 16A illustrates a condition where the body is subject to a uniform flow field 669a and flow separation occurs along the characteristic length of the body. Within the boundary layer, the influence of friction, i.e., friction drag $\tau$, creates V=0 when the coordinate normal to the surface n=0, which exists for each position $S_1$, $S_2$, and $S_3$, i.e., 'no slip condition' for fluid particles at the surface of the body as shown in FIG. 16B. The region of flow near the surface has velocity gradients, $\partial V/\partial n$, which are similarly due to the frictional forces between the surface and the fluid. As shown in FIG. 16B, as the fluid element travels across positions $S_1$, $S_2$, and $S_3$, the corresponding changes in velocity $V_1$, $V_2$, and $V_3$ corresponds to an adverse pressure gradient $p_3 > p_2 > p_1$ as shown in FIG. 16C. Also, $V_2$ slows due to friction at $S_2$, and at $S_3$, which represents the flow in its earliest moments of being started, $V_3$ is negative. As the flow develops, at $S_2$ for n=0, flow separation occurs and that fluid particle separates from the surface, causing a large wake of recirculating flow downstream of the surface Beyond this point, reversed flow occurs. Therefore, in addition to the generation of shear stress, the influence of friction can cause the flow over a body to separate from the surface. When the flow separates, such as the flow separation region 680a of FIG. 16A, the pressure distribution over the surface is greatly altered. The uniform flow field 669a that extends over the leading of the body no longer sees the complete shape of the body, but instead, sees the body upstream of the separation point, and that pressure force is instead integrated over the entire "effective body", thereby increasing pressure drag, p, 663a. Similarly, the flow downstream of the separation point becomes turbulent, which similarly increases friction drag $\tau$, which for slender bodies results in increased total drag. Therefore, when separation occurs over an arbitrary shape having sufficiently slender characteristics, e.g., 3:1, 4:1 as is the case with a representative vehicle, either or both of the representative components of external drag 661, pressure drag p and friction drag r may be adversely affected, the resultant summation of external drag 661 increases, as does the total drag 660 acting thereon. From a design perspective, keeping the flow from separating is one aspect that positively affects the aerodynamic performance of a vehicle, and this may be achieved in part by avoiding the design features common to conventional vehicles, as shown in FIGS. 14 and 15A-15F.

Aerodynamic vehicle 100 including aerodynamic heat exchanger 630 is now considered in the context of heat transfer design aspects. Among the most important inputs for the thermal design of a heat exchanger are the dimensionless heat transfer coefficients. Depending on whether the heat exchanger design can be classified as having external flow or internal flow—analogous to the aerodynamic considerations of external drag 661 and internal drag 662 of Table 1—different models may be used to approximate design aspects thereof. For example, an external flow heat exchanger, such as a surface exposed to ambient air flow, velocity and temperature boundary layer theory may be more suitable for approximating conditions therealong. As another example, for predominantly an internal flow heat exchanger, potential flow theory may be more suitable for approximating conditions, e.g., velocity and temperature profiles beginning with flow through a pipe inlet, to developing flow, and to developed flow therealong. Because of nonlinear relationships among geometry and operating conditions for a given heat exchanger design, i.e., given selected values for width, length, depth, fin spacing, materials, etc., data obtained for one exchanger size cannot be used to size or rate accurately a heat exchanger of a different size. Therefore, the surface characteristics of a given heat exchanger design, e.g., rejection capacity, are primarily obtained experimentally for most exchanger surfaces because the flow phenomena are complex due to the geometric features of flow area and/or heat transfer surface.

The previous description of the disclosed embodiments is provided to enable any person skilled in the art to make or use the invention. Various modifications to these embodiments will be readily apparent to those skilled in the art, and the principles defined herein can be applied to other embodiments without departing from the spirit or scope of the invention. It is therefore desired that the present embodiments be considered in all respects as illustrative and not restrictive, reference being made to the appended claims as well as the foregoing descriptions to indicate the scope of the invention.

What is claimed is:

1. An aerodynamic vehicle comprising:
a body including upper and lower body portions extending from a front end to a trailing end, said front end forming a tapered profile;
an aerodynamic heat exchanger disposed along said lower body portion extending from proximate said front end to proximate said trailing end, said aerodynamic heat exchanger comprising:
a chamber including an inner chamber portion and an outer chamber portion, said inner chamber portion having an inlet and an outlet disposed proximate a first end, at least one indentation, a fluid channel, and a channel divider, said outer chamber portion forming a body panel of said body, wherein in an assembled configuration, said inner and outer chamber portions form said chamber adapted to receive a fluid at said inlet, to expel said fluid at said outlet, said fluid passing along said fluid channel, said channel divider extending from said first end to proximate a second end, said channel divider providing a fluid separation within said chamber such that said fluid passes from said inlet, proximate said second end, and then through to said outlet, and wherein said at least one indentation is disposed along said fluid channel configured to promote turbulence of said fluid in said chamber;
an HVAC system coupled to said inlet and said outlet of said aerodynamic heat exchanger, said HVAC system being mechanically and thermally coupled to one or more demand systems and adapted to transfer heat to said aerodynamic heat exchanger to thereby be rejected to an ambient environment;
first, second, and third wheel assemblies coupled to said body; and
first and second strut assemblies each comprising one or more aerodynamic struts, said first strut assembly coupling said first wheel assembly to said body, said second strut assembly coupling said second wheel assembly to said body, said first and second strut assemblies disposed proximate said aerodynamic heat exchanger and said front end, along said lower body portion, wherein at least a portion of said aerodynamic heat exchanger is fluidly-unimpeded by said first and second strut assemblies so that, when the aerodynamic vehicle moves, laminar airflow surrounds at least the unimpeded portions of said aerodynamic heat exchanger.

2. The aerodynamic vehicle of claim 1, wherein said demand systems comprise one or more motors, one or more inverters, one or more batteries, and a cabin.

3. The aerodynamic vehicle of claim 1, wherein said one or more aerodynamic struts comprise a cross-sectional profile of an airfoil adapted to minimize the extent of flow separation caused therealong.

4. The aerodynamic vehicle of claim 1, wherein at least 50 percent to 90 percent of the airflow passing over said aerodynamic heat exchanger is laminar airflow.

5. The aerodynamic vehicle of claim 1, wherein at least 50 percent to 90 percent of the airflow passing over said aerodynamic heat exchanger remains attached along an outer heat rejection surface forming said body panel of said aerodynamic heat exchanger.

* * * * *